(12) United States Patent
Klostermann

(10) Patent No.: US 6,421,687 B1
(45) Date of Patent: Jul. 16, 2002

(54) DATA PARTITIONING AND DUPLICATION IN A DISTRIBUTED DATA PROCESSING SYSTEM

(75) Inventor: Lucas Klostermann, Breda (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/341,853
(22) PCT Filed: Jan. 16, 1998
(86) PCT No.: PCT/EP98/00386
 § 371 (c)(1),
 (2), (4) Date: Nov. 12, 1999
(87) PCT Pub. No.: WO98/32074
 PCT Pub. Date: Jul. 23, 1998

(30) Foreign Application Priority Data

Jan. 20, 1997 (EP) .............................................. 97200162

(51) Int. Cl.$^7$ .............................................. G06F 17/30
(52) U.S. Cl. ...................................... 707/202; 707/205
(58) Field of Search ................................ 707/201–202, 707/511, 8–10; 379/90.01, 93.19, 93.49

(56) References Cited

U.S. PATENT DOCUMENTS

| | | | | |
|---|---|---|---|---|
| 4,432,057 A | * | 2/1984 | Daniell et al. ................... | 707/8 |
| 5,001,628 A | * | 3/1991 | Johnson et al. ................ | 707/10 |
| 5,423,037 A | * | 6/1995 | Hvasshovd ................... | 707/202 |
| 5,555,404 A | * | 9/1996 | Torbjornsen et al. ........ | 707/202 |
| 5,893,128 A | * | 4/1999 | Nauckhoff ................... | 707/511 |
| 6,216,126 B1 | * | 4/2001 | Ronstorm ..................... | 707/10 |

FOREIGN PATENT DOCUMENTS

| | | |
|---|---|---|
| EP | 0381644 A2 | 8/1990 |
| WO | WO96/37837 | 11/1996 |

OTHER PUBLICATIONS

Oystein Torbjornsen, "An Overview of the ClustRa DBMS," 6 pages, 21$^{st}$ International Conference on Very Large Data Bases, Sep. 11–15, 1995.

Svein O. /Hvasshovd, et al., "Critical Issues in the Design of a Fault–Tolerant Multiprocessor Database Server," 3 pages, 21$^{st}$ International Conference on Very Large Data Bases, Sep. 11–15, 1995.

* cited by examiner

Primary Examiner—Jack Choules
Assistant Examiner—Mohammad Ali
(74) Attorney, Agent, or Firm—Burns, Doane, Swecker & Mathis, L.L.P.

(57) ABSTRACT

A database server with a "shared nothing" system architecture has multiple nodes, each having its own central processing unit, primary and secondary memory for storing database tables and other data structures, and communication channels for communication with other ones of the nodes. The nodes are divided into at least two groups that share no resources, including power supply and cooling system. Each database table in the system is divided into fragments distributed for storage purposes over all the nodes in the system. To ensure continued data availability after a node failure, a "primary replica" and a "standby replica" of each fragment are each stored on nodes in different ones of the groups. Database transactions are performed using the primary fragment replicas, and the standby replicas are updated using transaction log records. Every node of the system includes a data dictionary that stores information indicating where each primary and standby fragment replica is stored among the system's nodes. The records of each database table are allocated as evenly as possible among the table fragments, for example, by hashing a primary key value for each record with a predefined hash function and using the resulting value to select one of the database table fragments. A transaction manager on each node responds to database queries by determining which fragment of a database is being accessed by the query and then forwarding the database query to the node processor on which the primary replica of that fragment is stored. Upon failure of any one of the data processors in the system, each node updates the information in its data dictionary accordingly. In addition, the fragment replicas made unavailable by the node failure are regenerated and stored on the remaining available nodes in the same node group as the failed node.

14 Claims, 3 Drawing Sheets

DATA PARTITIONING AND DUPLICATION IN A DISTRIBUTED DATA PROCESSING SYSTEM

FIELD OF THE INVENTION

The present invention relates to real-memory data processing systems and, in particular, to distributed data processing systems comprising multi-processing platforms.

BACKGROUND OF THE INVENTION

In the art of data processing, in particular for the processing of vital data such as in telecommunications systems, in banking operations or at the stock market, for example, it is common to use some kind of backup processing and storage in order not to loose vital data in the case of failure of a data processing system or one of its components.

In some applications, dual processing and storage means are used, wherein one of the processing and storage means performs the actual processing of data and another of the processing and storage means operates in a stand-by mode. The stand-by equipment can either operate in an idle mode or parallel to the equipment performing the actual data processing such that, in case of failure, the processing tasks can be taken over by the stand-by equipment without delay or lost of data.

In an other system configuration, multi-processing and storage devices are provided, each performing part of the total data processing. The overall storage capacity of the system is larger than actually required, which provides the opportunity to store backup data distributed over the several storage means of the system. This type of operation is also known as the virtual storage distributed data processing concept, such as disclosed by EP 0 381 644.

In the system of EP 0 381 644 a cluster of processors operates on data structures in virtual storage sharable by each of the plurality of processors. A location table is used in order to store and retrieve data for processing purposes. The system assures the reliability of system-wide shared data structures in the event of failure of one of the processors by maintaining at least two copies of data stored and by maintaining two copies of the location table.

In large virtual storage systems a considerable amount of overhead can be envisaged in order to retrieve the desired data of data structures to be processed, as well as extended access times for storage transactions, increasing the total processing time. Despite the enhanced reliability of the overall data processing system, for high-speed data processing required in modern Intelligent Network (IN) telecommunication processing systems, the virtual storage concept is not always applicable.

WO96/37837 discloses a data base server system having multiple nodes, each comprising its own processing unit, communication equipment for communication with other nodes and storage means. The nodes are divided into at least two independent groups, which share nothing. The storage means of a node each just contain a fraction of the total system data. That is, for N nodes the total system data is divided in N fragments of essentially equal size, called, "primary replica", and each such fragment is copied and stored as a so-called "standby replica" in the storage means of a node belonging to another group. After failure of a node in a group, fragment replicas which have become unavailable are regenerated and stored on the remaining available nodes in the same group as the failed node.

In this system, because of the spreading of the total system data in fragments over all the nodes, a transaction manager is required for directing data of all queries to the particular processor and storage means comprising the primary replica of a particular data fragment to which a query relates.

Further, in the event of a node failure, the processing load on the node comprising the standby replica is (temporarily) doubled. That is, this node has to process the queries for its primary replica as well as for the standby replica of the primary replica which has become unavailable. This double load situation lasts until the standby replica has been portioned over the remaining available nodes of a group. However, this repair procedure even increases the load on the already double loaded node, which, in general, enhances the risk of failures and decreased processing speed.

Due to the extensive communication required between the nodes of a group and the transaction manager as well as the load doubling of a node in the event of a failure, this data base server system lacks application in modern Intelligent network (IN) telecommunication processing systems, wherein high-speed data processing is a prerequisite.

SUMMARY OF THE INVENTION

It is an object of the present invention to provide a method for data processing in a distributed data processing system, comprising a plurality of interconnected processing platforms and storage means, assuring a degree of reliability comparable to the virtual storage concept, while maintaining the processing speed of real-memory systems, although not being cursed with idle backup processing power.

It is a further object of the present invention to provide a method for distributed data processing providing a relatively even load distribution over the processing equipment of the system.

It is another object of the invention to provide a method for distributed data processing providing reliable failure handling in case of failure of a particular processing or storage device or devices.

These and other objects and advantages of the present invention are provided by a method for data processing in a distributed data processing system, comprising a plurality of processing platforms interconnected by a communication network, wherein a platform comprises processor means providing service to a plurality of processes, control means controlling process and system data handling by a platform and storage means allocated to the platform for storing and retrieving system data, the method comprising the step of:

a) storing in the storage means allocated to a platform part of the system data for processing by the platform, and being
   characterized by the steps of:
b) duplicating portions of the system data parts stored in storage means allocated to platforms other than the platform of step a);
c) storing the portions of duplicated system data in the storage means allocated to the platform of step a), and
d) processing of a portion of the duplicated system data by the platform of step a) if a platform to which the system data part is allocated corresponding to such portion is not able to process the system data part.

With the method of the invention, part of the total system data is allocated to a processing platform and portions or fragments of such part are duplicated and allocated to other processing platforms of the system. Preferably, each processing platform provides at least a set or a subset of like operations.

In the case of failure of a processing platform data originally allocated to the failing platform of the system is processed by the other platforms where portions of duplicated data reside. That is, the storage means comprising the duplicated or backup data portion of the system data which requires processing. The overall processing is not affected because another processing platform can provide service to portions of duplicated data stored in its storage means under the same conditions as the failing processing platform. Because each processing platform contributes to the overall data processing of the system, no idle processing means are envisaged.

It will be appreciated that, by the portioning of the duplicated system data according to the invention, in the event of platform failure load sharing is achieved because a live processing platform of the system just has to perform part of the processing power of the failing platform.

In an embodiment of the method according to the invention, operating in a system comprising a number of N processing platforms, each of which comprising storage means, N(N−1) different portions of duplicated system data are formed. In order to achieve enhanced reliability the duplicated data are stored such that each platform contains at least N−1 different portions of duplicated system data allocated to other processing platforms, i.e. storage means.

In a preferred embodiment of the method according to the invention, the duplicated system data of storage means are divided into portions of the same size. This to provide an even distribution of the load over the live processing platforms in case of failures.

A preferred update procedure of the system data stored at the various storage means of the system may include duplicating and portioning of system data on a periodic bases. The period of the updates can be made dependent on the rate of change of system data. To reduce system overhead, in particular in the case of peak processing periods, the duplicated data can be changed only with each change of the corresponding system data.

In order to locate duplicated system data stored in the storage means of the system, a location registration can be provided. This location registration is preferable stored at independent system control means, such that this registration is not affected in the case of failure of a processing platform.

A very reliable and robust data processing is achieved with another embodiment of the method according to the present invention, wherein the respective portions of duplicated system data are stored in selected ones of the storage means, for processing by a selected processing platform. This, to avoid the location registration and to provide direct access to the duplicated data in case of failure of the associated processing platform and/or storage means.

Storage means may be selected according to a partitioning algorithm which takes one or more keys of the system configuration into account, or in a predetermined manner.

In the case of failure of two or more processing platforms portions of duplicated system data stored at the failing processing platforms can, however, be affected. But, in the case of a relatively large number of processing platforms, only a relatively small amount of system data is involved.

At the failure of a platform and/or a storage means allocated to such platform, in a further embodiment of the method according to the invention, a copy of the system data to be stored in other storage means of the system is produced for such system data that it is no longer available at, at least two storage locations.

This is of advantage in the case of sequentially failing processing platforms and/or storage means, such that the live processing platforms can be entrusted to process all the system data from the copy stored.

In practice, it is statistically very unlikely that two or more platforms will go down at the same time, provided the overall system is adequately designed, i.e. separate independent powering, separate communication lines, separate connections etc.

With this in mind, in another embodiment of the invention, if a platform fails, a system re-configuration is started based on the existing complete data available from the remaining life platforms, as described above. The re-configuration aims at the remaining life platforms, following the above steps a), b) and c) and, if applicable, following a partitioning algorithm. After completion of the re-configuration, the complete primary and backup system data is available, providing all the features and advantages of the data partitioning and duplication of the present invention.

It will be appreciated that this re-configuration can be repeated in case a further platform and/or storage means of the remaining life platforms fail.

The invention relates further to a distributed data processing system, comprising a plurality of processing platforms interconnected by a communication network, a platform comprising processor means for providing service to a plurality of processes, control means for controlling process and data handling by a platform and storage means allocated to the platform for storage and retrieval of part of the system data for processing by the platform, characterized in that the storage means of a platform are arranged for storage and retrieval of duplicated portions of the system data parts stored in storage means of other platforms, such that in use a storage means of the system comprises the system data part for processing by its processing platform and duplicated portions of system data parts stored at other storage means of the system.

In a preferred embodiment of the system according to the invention control means are provided, interconnected to the processing platforms by the communication network, the system control means comprising processing means and further storage means. The further storage means are arranged for storing a system data location registration and at least portions of system data not longer available from at least two storage locations in the case of failure of a processing platform and/or storage means.

The method and system according to the present invention are in particular suitable for application in a telecommunication switching system for processing call and service requests of subscribers connecting to the switching system.

The above-mentioned and other features and advantages of the invention are illustrated in the following description with reference to the enclosed drawings.

DETAILED DESCRIPTION OF THE EMBODIMENTS

Figure 1:
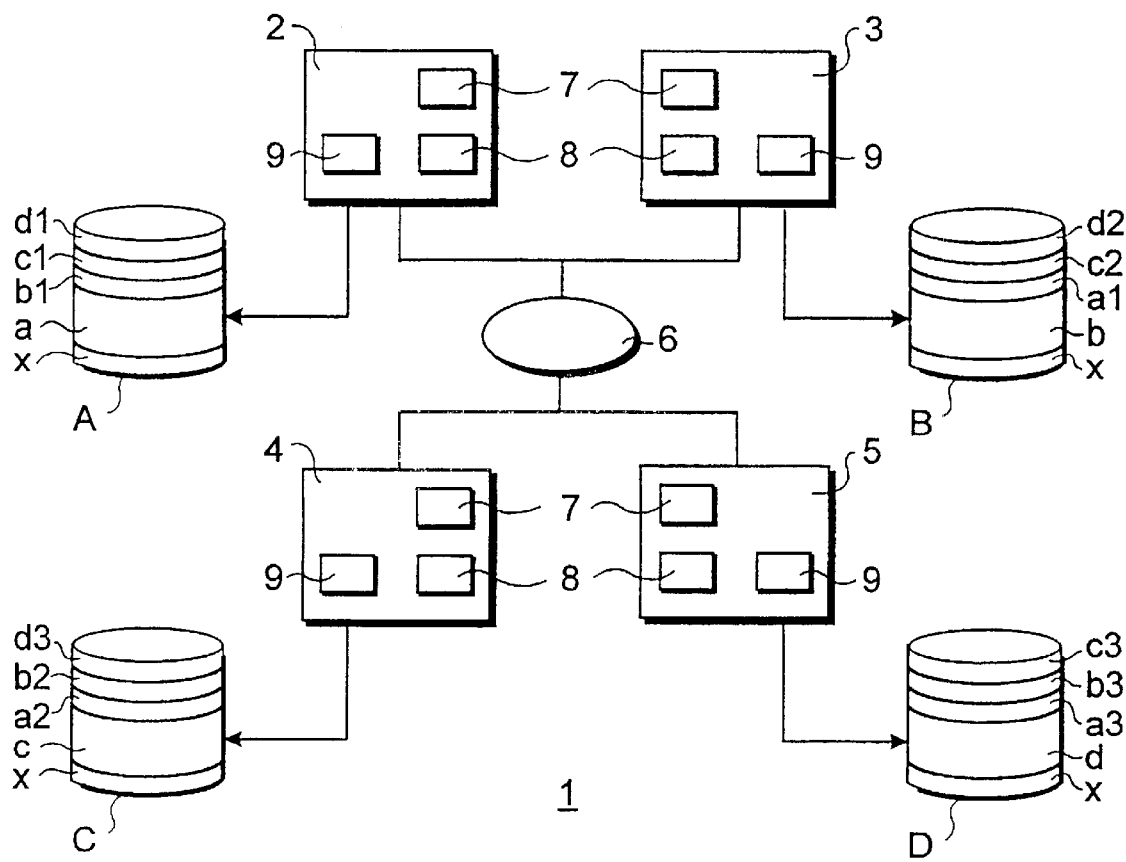
FIG. 1 shows a simplified block diagram of a distributed data processing system according to the present invention.

FIG. 1 shows an exemplary embodiment of the distributed data processing system 1 according to the present invention.

The system 1 comprises four so-called processing platforms 2, 3, 4, 5, which are interconnected via a communication network 6, which can be a private or dedicated communication network, or a public communication network.

Each processing platform 2, 3, 4, 5 comprises processor means 7 and control means 8 for controlling process and data handling by a platform 2, 3, 4, 5. Preferably, each platform provides a like set of processing operations.

To each platform 2, 3, 4, 5 storage means A, B, C, D are allocated, respectively. Each processing platform 2, 3, 4, 5 may be equipped with means 9 for storing and retrieving data from a storage means A, B, C, D allocated to the respective platform. The means 9 may also be part of the control means 8 of a platform.

In the embodiment shown, each of the storage means or data bases A, B, C, D is arranged to store system data relevant to its corresponding platform 2, 3, 4, 5 and, optionally, common data for memory control and access purposes, for example. The information content of the storage means A, B, C, D is illustratively shown in the form of segments.

The bottom segment comprises the above-mentioned common data, designated x. The other segments comprise system data for processing by a processing platform 2, 3, 4, 5.

Reference is now made to the storage means A. The system data segments of this storage means are numbered a, b1, c1, d1. The system data segments of the storage means B are designated b, a1, c2, d2. The system data segments of the storage means C are numbered c, a2, b2, d3 and the system data segments of the storage means are designated d, a3, b3, c3.

In accordance with the present invention, the system data segments a, b, c, d of the storage means A, B, C, D comprise part of the total system data to be primarily processed by the processing platforms 2, 3, 4, 5, respectively. The system data segments numbered ai, wherein i=1, 2, 3, each comprise a duplicated or backup portion or fragment of the primary system data a. Likewise, the system data segments bi, i=1, 2, 3, each comprise a portion or fragment of duplicated primary system data b, the segments ci, i=1, 2, 3, each comprise a portion or fragment of duplicated primary system data c and the segments di, i=1, 2, 3, each comprise a portion or fragment of duplicated primary system data d.

Accordingly, each of the storage means A, B, C, D comprise primary system data for which its associated processing platform provides service, and secondary or backup portions of duplicated system data of the other storage means for which the processing platform initially does not provide service.

Assuming a failure of processing platform 2 and/or its associated storage means A, the processing of the system data a can be taken over by the other processing platforms 3, 4, 5 in that for part a1 of the system data platform 3 is active, for part a2 processing platform 4 provides service and that for part a3 the processing platform 5 is responsible. Accordingly, failure of a platform and/or storage means will not affect the processing of the system data a, because the tasks of processing platform 2 are completely performed by the other processing platforms 3, 4, 5. Likewise, in the case of failure of any of the other processing platforms and/or its associated memory means, the processing tasks will be taken over by the other live processing platforms of the system.

Preferably, in the case of processing platforms 2, 3, 4, 5 having equal processing power, each of the storage means A, B, C, D comprise an equal part of the total system data as well as equal portions of duplicated system data at which the other processing platforms of the system primarily operate on. This has the advantage, in the case of failure of a processing platform, that the additional load is equally shared by the other processing platforms.

Those skilled in the art will appreciate that, according to the present invention, appropriate load sharing can be achieved by appropriate portioning and storage of the duplicated system data. The portioning of the duplicated system data can be chosen in respect of the number of data and/or the amount of service, i.e. processing power, required for particular data. The system data portioning, i.e. the primary system data and the secondary duplicated data, can also be dependent on the processing power of a particular platform, such that each platform, in the case of failure of another platform, is relatively equally extra loaded, for example.

The duplicated system data portions can be stored in any order in the storage means A, B, C, D. That is, the portion a1 can be stored in storage means D instead of storage means B, etc. However, it is preferred that each of the storage means A, B, C, D comprises a portion of the primary data of one of the other storage means of the system. This to enhance the system reliability in case of failure.

Further, like duplicated system data portions can be stored at more than one of the storage means, different from the storage illustrated in FIG. 1. That is, portion a1 can be stored not only at storage means B but also at storage means C, for example. Likewise, portion b2 can be stored at the storage means C and A, for example. This extra storage can be provided for all system data or for selected portions of system data. This dependent on the significance of the data, for example.

The duplicated system data portions can be stored in a fixed manner, for example such as disclosed in FIG. 1, or randomly, provided that the location of a data portion is known in the system. To this end a location registration of duplicated portions can be maintained for the system as a whole.

From the above description, it will be appreciated that the system according to the invention is not based on virtual storage of system data. Instead, to each of the processing platforms 2, 3, 4, 5 an amount of real memory is allocated, whereas the duplicated data portions are also located in real memory, i.e. one or more of the storage means A, B, C, D. Accordingly, the processing platforms 2, 3, 4, 5 have direct access to their relevant data and no time-consuming access procedure is required, such as a search in a location table etc. It is noted that the data in a storage means A, B, C, D can be stored in a virtual storage manner, which is, however, dependent on the internal memory structure of a storage means, and which is controlled by its common data part x.

In the case of system data which is subject to changes, its duplicate needs to be updated accordingly. Update of the system data can be performed on a periodic bases, for example controlled by the control means 8 of a processing platform 2, 3, 4, 5 or limited to an actual change of system data. The choice of update procedure may vary, dependent on the type of data as well as the momentary load of the processing platforms for example.

In the storage of the system data as shown in FIG. 1, of each of the data two samples exists, stored at different storage locations. That is, the original data and its duplicate. However, in the case of failure of two or more of the platforms and/or their corresponding storage means at the same time, part of the system data can not be processed by the other live processing platforms. Assume that the processing platforms 2, 3 are not available, for example. Accordingly, no service can be provided by the remaining live processing platforms 4, 5 for the system data a1 and b1. In practice, this can be a very small amount of the total system data, in particular in the case of a large number of processing platforms. Further, there exists no longer a copy of the system data a, b, c1, c2, d1 and d2.

In a further embodiment of the present invention, additional further storage means are provided for storing, in the case of failure of at least one of the processing platforms and/or storage means, such system data for which no longer a copy is available.

Assume that processing platform 2 fails, such that for the system data a, b1, c1 and d1 no copy is available. According to the invention, copies of the data stored in the storage means A are now obtained from the other storage means, that is system data a is obtained from the portions a1 stored at the storage means B, a2 stored at the storage means and a3 stored at the storage means D, and the data portions b1, c1, and d1 are retrieved and copied from the primary system data b, c, d stored in the storage means B, C, D respectively.

In the case of failure of a second platform, assume processing platform 3, which, as disclosed above, would lead to the unavailability of service for the data parts a1 and b1, with the additional storage means as described, these data portions are available at the additional storage means and can be copied, for example, to the other live storage means, C and D, for processing by the remaining live platforms 4, and 5. At the same time, the information lost by the failure of platform 3 will be retrieved from the remaining life storage means C and D as well as from the system data stored in the additional storage means.

In accordance with the present invention, if a particular platform fails, a re-configuration may be started which aims at the remaining life platforms. For example, assume platform 2 fails, such that a system re-configuration has to be based on the life platforms 3, 4 and 5.

Figure 2:
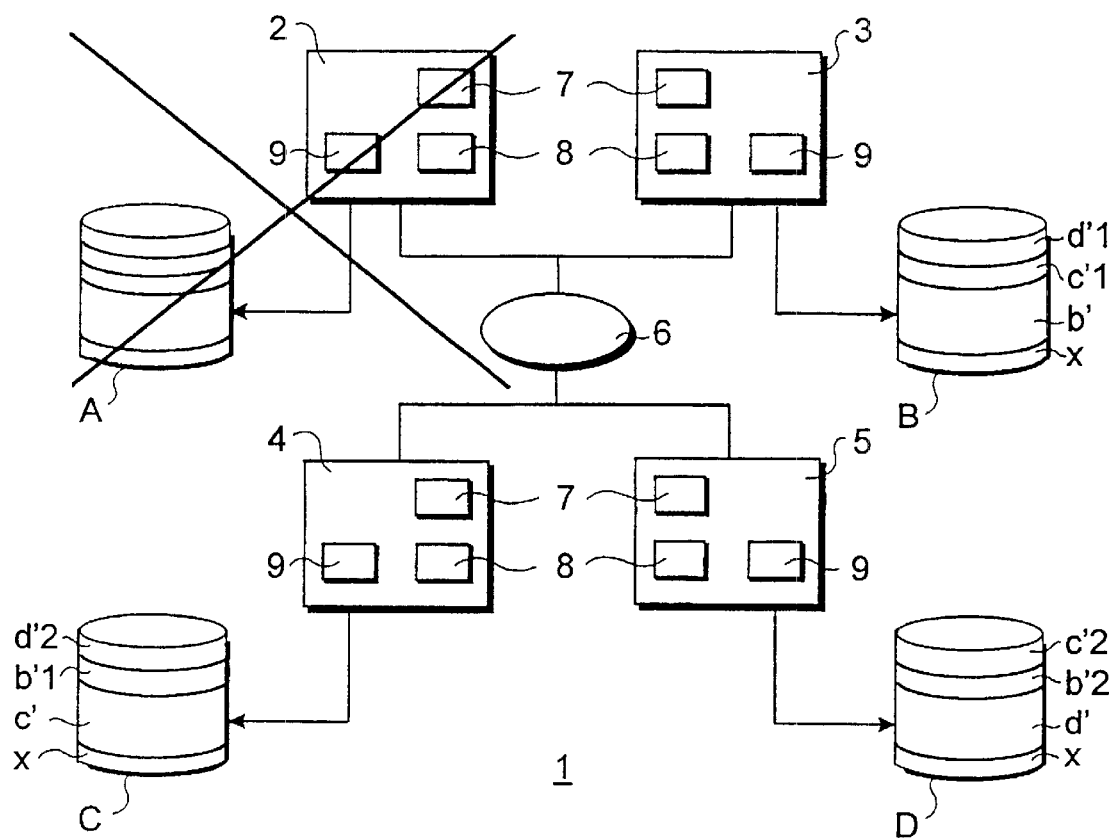
FIG. 2 shows a re-configuration of the data processing system of FIG. 1 in the event of a failure, following an embodiment of the invention.

As disclosed above, the complete system data is still available from the storage means B, C and D. The re-configuration process now requires a different data portioning, as illustrated in FIG. 2.

The system data segments b', c' and d' of the storage means B, C, D comprise part of the total system data to be primarily processed by the processing platforms 3, 4 and 5, respectively. The system data segment b'i wherein i is 1,2 comprise a duplicated portion of the primary system data b'. Likewise, the system data segments c'i, i=1,2 comprise a portion of duplicated primary system data c', and the segments d'i, i=1,2 comprise a portion of duplicated primary system data d'. Note that the sum of the segments b', c' and d' represents the complete or total system data.

The above system re-configuration is, of course, only possible if the storage means B, C and D have enough storage capacity to store the above primary system data segments and the duplicated or backup portions which, in the case of an even distribution, for example, comprise more data than in the four-platform embodiment (see FIG. 1).

If the re-configuration is completed before another platform fails, the complete data set is still available, even without the need for additional storage means, as described above.

In the event that the down platform will return alive, the original data partitioning will be restored following the method of the invention.

In the case of a big system down, i.e. more than one platform, the data of the storage means that needs to be preserved may be copied to disk memory. Rather, such disk memory may be a "secure" disk system, consisting of duplicated disks while the data may be copied to the disk memory following the partitioning method of the present invention.

It will be appreciated by those skilled in the art that, for the purpose of the present invention, failure of a platform includes any non-availability of a platform such as for maintenance purposes and the like.

Figure 3:
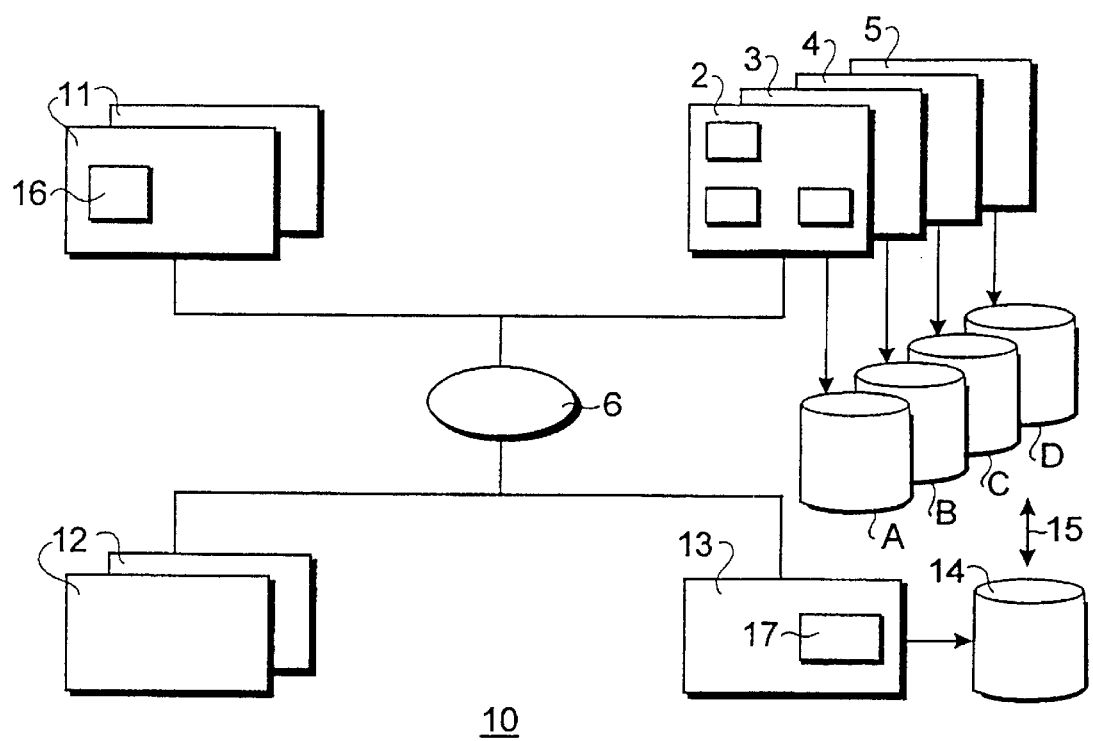
FIG. 3 shows a simplified block diagram of the application of the distributed data processing system according to the invention in a telecommunication switching environment.

Reference is now made to FIG. 3, which shows an application of the distributed data processing method and system disclosed above in connection with FIG. 1. The system 10, shown in FIG. 3 is a data processing architecture for a telecommunication switching system for the processing of call and service request of subscribers connecting to the switching system. The system comprises means 11 for the interpretation of service and call requests from subscribers (not shown), processing platforms 2, 3, 4 with associated storage means A, B, C, signalling means 12 and system control means 13 to which additional storage means 14 are allocated. The interpreting means 11 the platforms 2, 3, 4, the signalling means 12 and the system control means 13 are interconnected via a communication network 6.

The system control means 13 with its associated storage means 14 may provide the above disclosed feature of storage of system data for which occasionally no longer at least two storage locations are available. In the figure, this is illustratively indicated with an arrow 15.

The interpreting means 11 comprise so-called trader means 16, which, in this embodiment provide control of the update of system data requiring changes, for example subscriber data such as telephone numbers, access to certain services etc. It will be appreciated that any changes in the system data needs corresponding changes of the data stored at the several storage means A, B, C and, if applicable, in additional storage means. Update and duplication of data can also be performed by the system control means 13, which can also keep a location registration 17 of the duplicated data portions among the several storage means of the system 10 to handle data access.

The location registration means 17 may also comprise a data partitioning algorithm or rules for the portioning of system data among selected platforms and data segment size, both during normal operation and in the case of failure, as disclosed above.

The storage means A, B, C are any type of storage means for reading and, if applicable, writing of information such as Random Access Memory (RAM), memory disks etc.

From the above description, it will be appreciated that the invention provides a very reliable distributed data processing method and system, based on real memory allocations, providing fast access to data, load distribution by distribution of duplicated data in the case of failure of processing power and/or storage capacity, and not requiring complicated data location registration and update procedures.

The invention is not restricted to its application with four processing platforms and four storage means, but is rather applicable to a system having N processing platforms and N or more storage means. The invention is generally applicable in data distribution systems and, in particular, in such systems requiring fast processing.

What is claimed is:

1. A method for data processing in a distributed data processing system, comprising a plurality of processing platforms interconnected by a communication network, wherein a platform comprises processor means providing service to a plurality of processes, control means controlling process and system data handling by a platform and storage means allocated to said platform for storing and retrieving system data, said method comprising the step of:

a) storing in the storage means allocated to a platform part of the system data for processing by said platform, and being characterized by the steps of:

b) duplicating portions of system data parts stored in storage means allocated to platforms other than the platform of step a);

c) storing said portions of duplicated system data in the storage means allocated to the platform of step a), and d) processing of a portion of said duplicated system data by the platform of step a) if a platform to which the system data part is allocated corresponding to said portion is not able to process said system data part, wherein said step c) is performed regardless of whether any of said platforms other than the platform of step a) is able to process the system data part allocated to said any of said platforms other than the platform of step a).

2. A method according to claim 1, wherein said system comprises a number of N processing platforms, each of which comprising allocated storage means, wherein at step b) N(N−1) different portions of duplicated system data are formed, and wherein at step c) said portions are stored in the storage means of a platform, such that each platform contains at least N−1 different portions of duplicated system data.

3. A method according to claim 2, wherein duplicated system data of a storage means are sub-divided into portions of the same size.

4. A method according to claim 1, wherein steps b) and c) are performed on a periodic bases and/or wherein after each change of system data its duplicate is accordingly changed.

5. A method according to claim 1, wherein a location registration of system data stored in said storage means of the system is provided.

6. A method according to claim 1, wherein respective portions of duplicated system data are stored in selected storage means for processing by a selected processing platform.

7. A method according to claim 1, wherein if a platform and/or a storage means are not available, such that data stored in a storage means can not be processed, a copy is produced from the system data stored in other storage means of the system for such system data which is no longer available from at least two storage locations.

8. A method according to claim 1, wherein if a platform and/or storage means are not available, a system re-configuration is established, based on the total system data and the available platforms and storage means following the steps a), b) and c) of claim 1.

9. Use of the distributed data processing method and system according to claim 1, in a telecommunication switching system for processing call and service requests of subscribers connecting to said switching system.

10. A distributed data processing system, comprising a plurality of processing platforms interconnected by a communication network, a platform comprising processor means for providing service to a plurality of processes, control means for controlling process and data handling by a platform and storage means allocated to said platform for storage and retrieval of part of said system data for processing by said platform, characterized in that said storage means of a platform are arranged for storage and retrieval of duplicated portions of the system data parts stored in storage means of other platforms, such that in use a storage means of the system comprises said system data part for processing by its processing platform and duplicated portions of system data parts stored at other storage means of the system, regardless of whether any one of said other platforms is able to process said system data part included in said storage means allocated to said any one of said other platforms.

11. A system according to claim 10, wherein said control means of said processing platforms are arranged for duplicating and portioning of system data, and for providing a location registration of duplicated portions.

12. A system according to claim 10, further comprising system control means, interconnected to said processing platforms by said communication network, said system control means comprising processing means and storage means arranged for storing a system data location registration and at least portions of system data not longer available from at least two storage locations in the case of failure of a processing platform and/or storage means.

13. Use of the distributed data system according to claim 10, in a telecommunication switching system for processing call and service requests of subscribers connecting to said switching system.

14. A method for processing data in a distributed data processing system which includes a plurality of processing platforms interconnected by a communication network, wherein each one of said plurality of processing platforms includes a processor, a controller for controlling handling of system data by said each one of said plurality of processing platforms and a storage device, the method comprising the steps of:

a) storing, in the storage device included in a first one of said plurality of processing platforms, a first part of said system data for processing by said first one of said plurality of processing platforms;

b) storing, in the storage device included in said first one of said plurality of processing platforms, a first duplicated portion of a second part of said system data stored in a second storage device included in a second one of said plurality of processing platforms, regardless of whether it is determined whether said second one of said plurality of processing platforms is able to process said second part of said system data, wherein said second one of said plurality of processing platforms is different from said first one of said plurality of processing platforms;

c) processing said first duplicated portion by said first one of said plurality of processing platforms if it is determined that said second one of said plurality of processing platforms is not able to process said second part of said system data;

d) storing, in the storage device included in said first one of said plurality of processing platforms, a second duplicated portion of a third part of the system data stored in a third storage device included in a third one of said plurality of processing platforms, regardless of whether it is determined whether said third one of said plurality of processing platforms is able to process said third part of said system data, wherein said third one of said plurality of processing platforms is different from said first one of said plurality of processing platforms and said second one of said plurality of processing platforms; and e) processing said second duplicated portion by said first one of said plurality of processing platforms if it is determined that said third one of said plurality of processing platforms is not able to process said third part of said system data.

\* \* \* \* \*